United States Patent
Huang

(10) Patent No.: US 10,492,115 B2
(45) Date of Patent: Nov. 26, 2019

(54) MOBILITY MANAGEMENT METHOD AND APPARATUS

(71) Applicant: Beijing Xiaomi Mobile Software Co., Ltd., Beijing (CN)

(72) Inventor: Jiangtao Huang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 15/875,404

(22) Filed: Jan. 19, 2018

(65) Prior Publication Data
US 2018/0206160 A1    Jul. 19, 2018

(30) Foreign Application Priority Data

Jan. 19, 2017    (CN) .......................... 2017 1 0039397

(51) Int. Cl.
| | | |
|---|---|---|
| H04W 36/34 | (2009.01) | |
| H04W 36/04 | (2009.01) | |
| H04W 36/00 | (2009.01) | |
| H04W 36/30 | (2009.01) | |

(52) U.S. Cl.
CPC ....... H04W 36/04 (2013.01); H04W 36/0022 (2013.01); H04W 36/0083 (2013.01); H04W 36/34 (2013.01); H04W 36/30 (2013.01)

(58) Field of Classification Search
CPC . H04W 36/04; H04W 36/30; H04W 36/0022; H04W 36/34
See application file for complete search history.

(56) References Cited

U.S. PATENT DOCUMENTS

| | | | | |
|---|---|---|---|---|
| 7,263,332 | B1* | 8/2007 | Nelson ................... | H04B 1/034 381/86 |
| 2016/0316417 | A1* | 10/2016 | Adachi ................ | H04W 12/06 |
| 2018/0368046 | A1* | 12/2018 | Zhang ................... | H04W 36/38 |

FOREIGN PATENT DOCUMENTS

EP         2950576 A1    12/2015

OTHER PUBLICATIONS

Extended European Search Report issued in corresponding European Application No. 18152488.5, dated Apr. 12, 2018, 11 pages.
MediaTek Inc., "RRM enhancement in aid of UL signal," 3GPP TSG RAN WG1 Meeting #87, R1-1612141, URL: http://www.3gpp.org/ftp/Meetings_3GPP_SYNC/RAN1/Docs/, Nov. 14-18, 2016, 6 pages.

(Continued)

*Primary Examiner* — Wei Zhao
(74) *Attorney, Agent, or Firm* — Arch & Lake LLP

(57) ABSTRACT

The present disclosure provides a mobility management method and apparatus. The method may include: receiving a plurality of uplink reference signals periodically transmitted by a user equipment; generating network indication information according to variation information of the plurality of uplink reference signals; delivering the network indication information to the user equipment, enabling the user equipment to perform a corresponding operation according to the network indication information and transmit operation information; and performing mobility management on the user equipment according to the operation information transmitted by the user equipment.

14 Claims, 8 Drawing Sheets

(56) References Cited

OTHER PUBLICATIONS

Sony, "UL Mobility for NR," 3GPP TSG RAN WG1 NR Adhoc, R1-1700670, URL: http://www.3gpp.org/ftp/Meetings_3GPP_SYNC/RAN1/Docs/, Jan. 16-20, 2017, 6 pages.

Samsung, "UL Mobility Analysis," 3GPP TSG-RAN WG1 Meeting #87, R1-1612473, URL: http://www.3gpp.org/ftp/Meetings_3GPP_SYNC/RAN1/Docs/, Nov. 14-18, 2016, 6 pages.

* cited by examiner

MOBILITY MANAGEMENT METHOD AND APPARATUS

CROSS REFERENCE TO RELATED APPLICATION

This application is based on and claims priority to Chinese Patent Application No. 201710039397.9, filed Jan. 19, 2017, the entire contents of which are incorporated herein by reference.

TECHNICAL FIELD

The present disclosure relates to the field of computer communication technologies, and more particularly, to a mobility management method and apparatus.

BACKGROUND

In an existing mobile communication system such as a 4G network, mobility management of a user equipment (UE) is implemented based on a downlink, the general process thereof being as below: a network side equipment transmits a cell measurement signaling carrying measurement rules to the UE; a terminal detects downlink data of an access cell or adjacent cell according to the measurement rules, obtains a measurement result and transmits the measurement result to the network side equipment; and the network side equipment selects, for the UE, a target cell with better communication performance when deciding that the UE needs cell handover according to the measurement result.

However, when the UE is in a scene moving at high speed such as a train running at high speed, cell change needs to be quickly carried out because of quick change of a geographical position. Due to a complex information interaction process, adoption of a downlink mobility management method in the related art may cause a series of problems, for example, failure of timely cell change, excessive signaling overhead and power consumption caused by frequent cell measurement, and incidental call drop or network drop and so on, which has a negative effect on the use experience of the UE.

SUMMARY

In view of this, the present disclosure provides a mobility management method and apparatus to improve the communication performance of a user equipment moving at high speed.

According to a first aspect of embodiments of the present disclosure, there is provided a mobility management method, which is applied to a network side equipment and including: receiving a plurality of uplink reference signals periodically transmitted by a user equipment; generating network indication information according to variation information of the plurality of uplink reference signals; delivering the network indication information to the user equipment so that the user equipment performs a corresponding operation according to the network indication information and feeds back operation information; and performing mobility management on the user equipment according to the operation information transmitted by the user equipment.

According to a second aspect of the embodiments of the present disclosure, there is provided a mobility management method, applied to a user equipment and including: periodically transmitting a plurality of uplink reference signals to a network side equipment; receiving network indication information delivered by the network side equipment; performing a corresponding operation according to the network indication information and a current radio resource control state to obtain operation information; and transmitting the operation information to the network side equipment so that the network side equipment performs mobility management on the user equipment.

According to a third aspect of the embodiments of the present disclosure, there is provided a mobility management apparatus, which is arranged in a network side equipment and includes: a reference signal receiver, configured to receive a plurality of uplink reference signals periodically transmitted by a user equipment; an indication information generator, configured to generate network indication information according to variation information of the plurality of uplink reference signals; a transmitter, configured to deliver the network indication information to the user equipment so that the user equipment performs a corresponding operation according to the network indication information and feeds back operation information; and a management circuit, configured to perform mobility management on the user equipment according to the operation information transmitted by the user equipment.

According to a fourth aspect of the embodiments of the present disclosure, there is provided a mobility management apparatus, which is arranged in a user equipment and includes: a reference signal transmitter, configured to periodically transmit a plurality of uplink reference signals to a network side equipment; an indication information receiver, configured to receive network indication information delivered by the network side equipment; an operating circuit, configured to perform a corresponding operation according to the network indication information and a current radio resource control state to obtain operation information; and an operation information transmitter, configured to transmit the operation information to the network side equipment so that the network side equipment performs mobility management on the user equipment.

According to a fifth aspect of the embodiments of the present disclosure, a mobility management apparatus is provided, which includes: a processor, and a memory, configured to store instructions executable by the processor; the processor is configured to: receive a plurality of uplink reference signals periodically transmitted by a user equipment; generate network indication information according to variation information of the plurality of uplink reference signals; deliver the network indication information to the user equipment so that the user equipment performs a corresponding operation according to the network indication information and feeds back operation information; and perform mobility management on the user equipment according to the operation information transmitted by the user equipment.

According to a sixth aspect of the embodiments of the present disclosure, a mobility management apparatus is provided, which includes: a processor, and a memory, configured to store instructions executable by the processor; the processor is configured to: periodically transmit a plurality of uplink reference signals to a network side equipment; receive network indication information delivered by the network side equipment; perform a corresponding operation according to the network indication information and a current radio resource control state to obtain operation information; and transmit the operation information to the network side equipment so that the network side equipment performs mobility management on the user equipment.

According to a seventh aspect of the embodiments of the present disclosure, there is provided a non-transitory computer-readable storage medium having stored therein instructions that, when executed by a processor of a network side equipment, causes the network side equipment to perform a mobility management method, the method comprising: receiving a plurality of uplink reference signals periodically transmitted by a user equipment; generating network indication information according to variation information of the plurality of uplink reference signals; delivering the network indication information to the user equipment, enabling the user equipment to perform a corresponding operation according to the network indication information and transmit operation information; and performing mobility management on the user equipment according to the operation information transmitted by the user equipment.

According to a eighth aspect of the embodiments of the present disclosure, there is provided a non-transitory computer-readable storage medium having stored therein instructions that, when executed by a processor of a user equipment, causes the user equipment to perform a mobility management method, the method comprising: periodically transmitting a plurality of uplink reference signals to a network side equipment; receiving network indication information delivered by the network side equipment; performing a corresponding operation according to the network indication information and a current radio resource control state to obtain operation information; and transmitting the operation information to the network side equipment, enabling the network side equipment to perform mobility management on the user equipment.

It should be understood that the above general description and the detailed description below are merely exemplary and explanatory, and do not limit the present disclosure.

BRIEF DESCRIPTION OF THE DRAWINGS

The accompanying drawings herein are incorporated in and constitute a part of this specification, illustrate embodiments conforming to the present disclosure and together with the description serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following exemplary embodiments do not represent all implementations consistent with the present disclosure. Instead, they are merely examples of apparatuses and methods consistent with aspects related to the present disclosure as recited in the appended claims.

Terms used in the present disclosure are only for the purpose of description of specific embodiments, and are not intended to limit the present disclosure. As used in the present disclosure and appended claims, the singular forms "a/an", "said" and "the" intend to also include the plural form, unless the content clearly dictates otherwise. It should also be understood that the term "and/or" used herein means to include arbitrary and all possible combinations of one or more items listed in association.

It should be understood that terms such as "first", "second", "third" and the like may be used herein for description of information. However, the information shall not be restricted to these terms. These terms are only intended to distinguish among information of the same type. For example, under the circumstance of not departing from the scope of the present disclosure, a first information can also be referred to as a second information, similarly, a second information can also be referred to as a first information. Depending on the context, term "if" used herein can be interpreted as "when", "while" or "in response to determining".

In the embodiments of the present disclosure, an involved execution subject may include a user equipment in a high speed moving state and a network side equipment performing mobility management on the user equipment. The user equipment (UE) may be an electronic equipment having mobile communication functions, for example, a user terminal, a user node, a mobile terminal, a tablet computer and so on in a 5G communication network system. The network side equipment may be a core network equipment in the 5G communication network system. In a specific implementation process, the user equipment and the network side equipment are stand-alone and interconnected to jointly implement the technical solutions provided by the present disclosure. The mobility management method provided by the present disclosure is described below first taking the network side equipment as an example.

Figure 1:
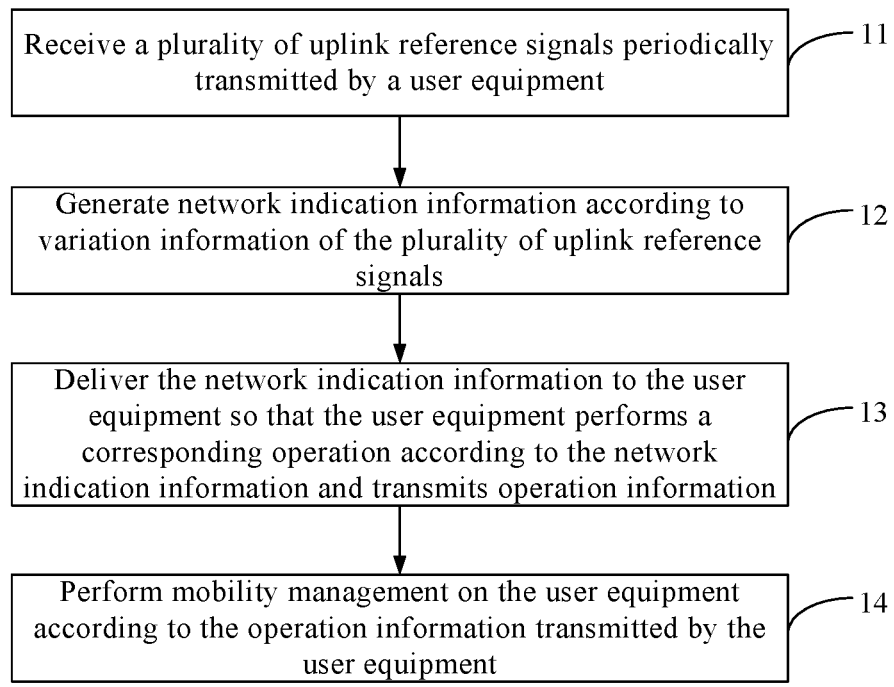
FIG. 1 is a flowchart of a mobility management method illustrated according to an aspect of the present disclosure.

Referring to FIG. 1, which illustrates a flowchart of a mobility management method according to an aspect, the method may include the following steps.

In Step 11, a plurality of uplink reference signals periodically transmitted by user equipment is received.

In the embodiment of the present disclosure, the user equipment may periodically transmit the plurality of uplink reference signals (RS) to a current access base station cell. In the present disclosure, the network side equipment may manage all base stations in a network topology, and acquire information of the user equipment by means of the base stations. That is, the network side equipment may acquire the intensity of the uplink RS signals transmitted by a user equipment by means of one or more base stations.

In Step 12, network indication information is generated according to variation information of the uplink signal.

In the embodiment of the present disclosure, the variation information of the uplink RS signals of the UE acquired by the network side equipment may include variation conditions of signal intensity (RSRP), variation conditions of signal quality (RSRQ), and frequency offset information of the uplink RS signals, etc.

The network side equipment may perform cell handover on the UE in a connected state according to the variation conditions of the uplink RS signals of the UE, or instruct the UE in an idle state to reselect a cell.

In the present disclosure, the network indication information at least includes area information of one or more to-be-selected cells adjacent to a current access base station cell of the UE. Supposing the current access base station cell of the UE is a first cell and the to-be-selected cells determined by the network side equipment are a second cell and a third cell, the area information includes: a cell identifier of the second cell and an area identifier of an area to which the second cell belongs, and a cell identifier of the third cell and an area identifier of an area to which the third cell belongs.

In a network topology corresponding to an application scene of the embodiment of the present disclosure, networking may be performed taking a base station cell as a unit, and meanwhile area partition may also be performed on the base station cell, wherein each area may include a plurality of base station cells. A plurality of areas may be passed through when the user equipment is moving at high speed relatively to a stationary reference object. Supposing a province subject to geographical division is taken as an area, when the user equipment is on a high-speed train such as a bullet train above 220 kilometers per hour or a high-speed train above 350 kilometers per hour, geographic areas of a plurality of provinces may likely be passed through as the high-speed train moves quickly. When the user equipment enters from one area to another area, to guarantee communication quality, area update is needed, which is also accompanied with cell update. In another aspect, cell update is required when the user equipment moves from one base station cell to another base station cell of the same area. Therefore, the network indication information determined by the network side equipment includes: the cell identifier of a to-be-selected cell and the area identifier of an area to which the to-be-selected cell belongs.

In the present disclosure, based on different variation information of the plurality of uplink reference signals, the network side equipment may adopt following manners to generate the network indication information.

Figure 2:
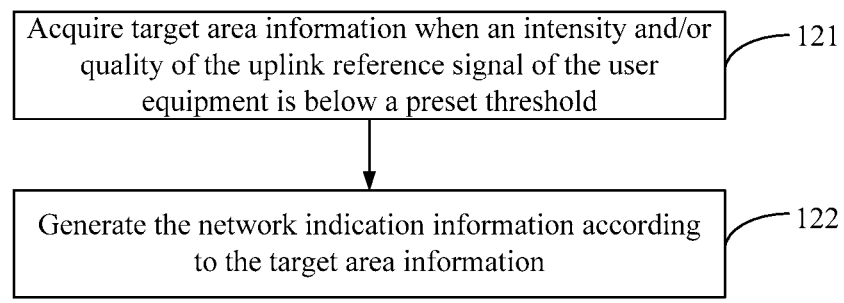
FIG. 2 is a flowchart of another mobility management method illustrated according to an aspect of the present disclosure.

In the first manner, referring to FIG. 2, which illustrates a flowchart of another mobility management method according to an aspect, the Step 12 may include following steps.

In Step 121, target area information is acquired when an intensity and/or quality of the plurality of uplink reference signals of the user equipment is below a preset threshold.

In the present disclosure, when the user equipment is moving at high speed relatively to a reference object, the communication signal intensity and the communication signal quality may correspondingly change from weaker to stronger and then change from stronger to weaker as the distance between the user equipment and a base station changes from farther to nearer and then changes from nearer to farther. Each base station may report, to the network side equipment, the received variation information of the plurality of uplink reference signals of the user equipment. The network side equipment decides, according to the variation information of the plurality of uplink reference signals of the user equipment, an opportunity to determine the target area information.

Specifically, the network side equipment has a preset threshold corresponding to the signal information. Taking an example in which the signal information is the signal intensity, the network side equipment has a preset signal intensity threshold. When detecting that the signal intensity of the plurality of uplink reference signals of the first cell accessing the user equipment is below the preset signal intensity threshold, the network side equipment determines, according to network topology information, cell identifiers of other cells adjacent to the first cell and area identifiers of areas where the cells are to obtain the target area information.

In Step 122, the network indication information is generated according to the target area information.

In the embodiment of the present disclosure, generally, the current access first cell of the UE has a plurality of adjacent cells, and the network side equipment cannot determine which cell adjacent to the first cell the UE may pass through next. Therefore, the area information of a plurality of cells adjacent to the first cell may be packaged into the network indication information so as to prepare for transmitting the information to the UE.

Figure 3:
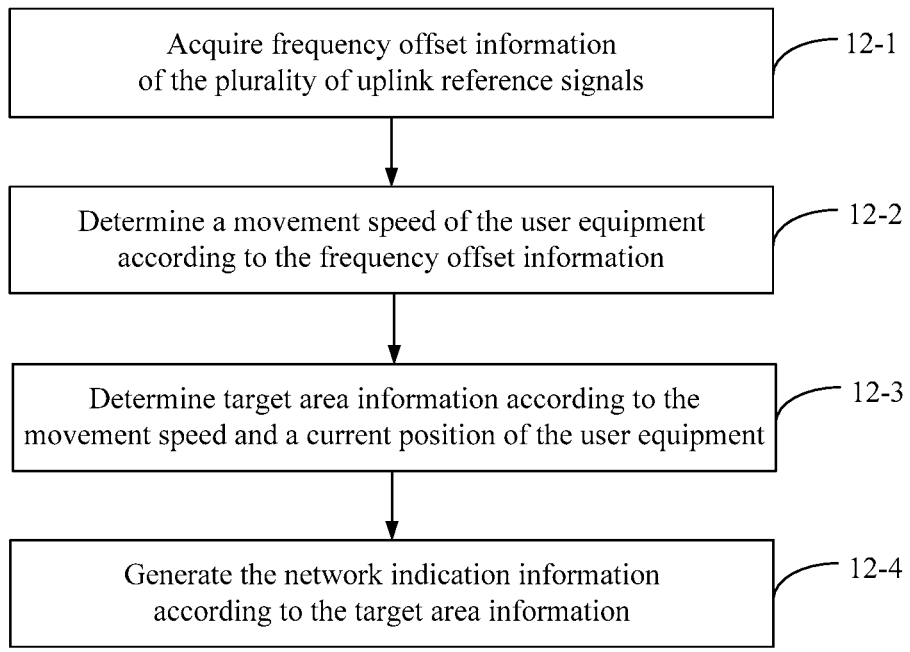
FIG. 3 is a flowchart of another mobility management method illustrated according to an aspect of the present disclosure.

In the second manner, referring to FIG. 3, which illustrates a flowchart of another mobility management method according to an aspect, the Step 12 may include following steps.

In Step 12-1, frequency offset information of the plurality of uplink reference signals is acquired.

The user equipment adopts a carrier wave having an appointed frequency point in a communication protocol to transmit the plurality of uplink reference signals to a base station. However, high-speed movement of the UE may cause the frequency of the carrier wave to deviate, namely a frequency offset may occur. That is, the carrier wave frequency of the plurality of uplink reference signals received by the base station may slightly deviate toward one side or two sides relatively to the carrier wave frequency appointed by the two parties.

In Step 12-2, a movement speed of the user equipment is determined according to the frequency offset information.

After the base station reports the frequency offset information of the user equipment to the network side equipment, the network side equipment may determine the movement speed of the user equipment using related technologies according to the frequency offset information. The movement speed of the user equipment includes a movement direction and a movement velocity of the user equipment.

In Step 12-3, target area information is determined according to the movement speed and a current position of the user equipment.

In the embodiment of the present disclosure, the network side equipment may roughly estimate the current position of the user equipment according to the current access base station cell of the user equipment and the plurality of uplink reference signals information. The network side equipment stores information of the whole network topology, including: information related to the cell position and cell coverage area and so on. Therefore, the network side equipment may estimate, according to the current position and the movement speed of the user equipment, a cell through which the user equipment will likely pass at a future moment and an area to which the cell belongs to obtain the target area information.

In Step 12-4, the network indication information is generated according to the target area information.

This Step is similar to the Step 122, and thus is not repeated any more herein.

In the present disclosure, the network side equipment is not limited to not determining the target area information unless detecting a poor uplink RS signals. It may be preestimated, in advance, which areas the UE will enter according to the frequency offset information of the uplink RS signals, so that the network side equipment may deliver, in advance, the area information of the to-be-entered areas, as the target area information, to the user equipment. The user equipment may measure a regional signal or reselect a cell according to the target area information acquired in advance, thereby reducing an operation delay, improving a mobility management efficiency, and guaranteeing the communication quality of the user equipment.

In Step 13, the network indication information is delivered to the user equipment so that the user equipment performs a corresponding operation according to the network indication information and feeds back operation information.

In the embodiment of the present disclosure, corresponding to the two implementations in the Step 12, the network side equipment may transmit the network indication information to the user equipment after the uplink RS signal is below the preset threshold, or may transmit the network indication information before the uplink RS signal is below the preset threshold. The network indication information may include operation time to instruct the user equipment to perform the corresponding operation within designated time. The operation may be an operation of measuring a regional signal or an operation of reselecting a cell.

Correspondingly, after receiving the network indication information, the UE performs the corresponding operation according to a current radio resource control (RRC) state and feeds the operation information back to the network side equipment.

When the UE currently is in a connected state, a regional signal is measured according to the network indication information, and a regional signal measurement result is transmitted to the network side equipment.

When the UE currently is in the idle state, the UE may detect the intensity and quality of the signal of each received cell, match the detected cell with the target area information in the network indication information, reselect an access cell with reference to the intensity and quality of the signal, and transmit the regional information of the reselected cell to the network side equipment.

In Step 14, mobility management is performed on the user equipment according to the operation information transmitted by the user equipment.

Correspondingly, based on the current RRC state of the UE, implementation of the Step 14 also includes following two cases.

Figure 4:
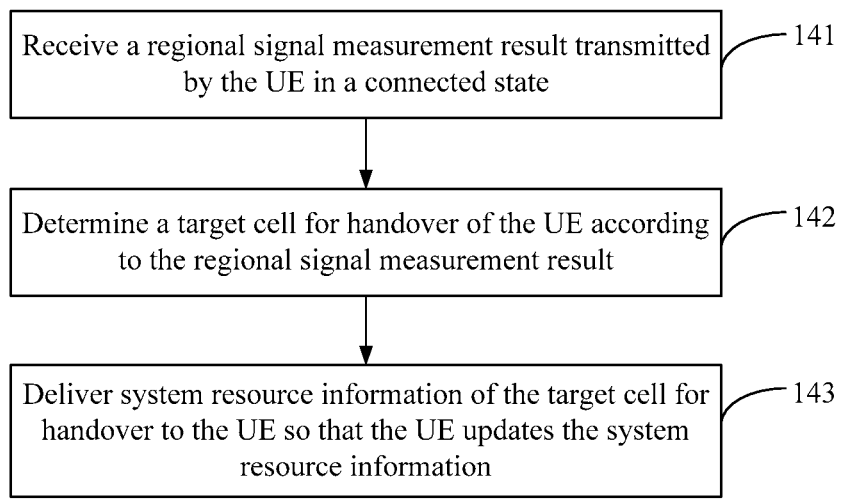
FIG. 4 is a flowchart of another mobility management method illustrated according to an aspect of the present disclosure.

In the first case, referring to FIG. 4, which illustrates a flowchart of another mobility management method according to an aspect, the above Step 14 may include following steps.

In Step 141, a regional signal measurement result transmitted by the UE in a connected state is received.

In Step 142, a target cell for handover of the UE is determined according to the regional signal measurement result.

For example, based on the intensity and/or quality of the cell signal measured by the UE, the network side equipment decides which cell is the current access base station cell of the UE handed over to, for example, handed over to a second cell, to determine handover information. Herein it is to be noted that when the second cell and the first cell do not belong to the same area, the handover information further includes a target area identifier.

In Step 143, system resource information of the target cell for handover is delivered to the user equipment so that the user equipment updates the system resource information.

The network side equipment transmits the system resource information (i.e., a network reconfiguration message) of the target cell for handover to the UE via an air interface message to inform the UE to hand over a cell.

Based on the received network reconfiguration message, the UE performs corresponding configuration modification on system resource information of a media control center (MAC), a radio link control (RLC) and so on, updates as the system resource information of the second cell, and guarantees to successfully implement cell handover without communication interruption.

Figure 5:
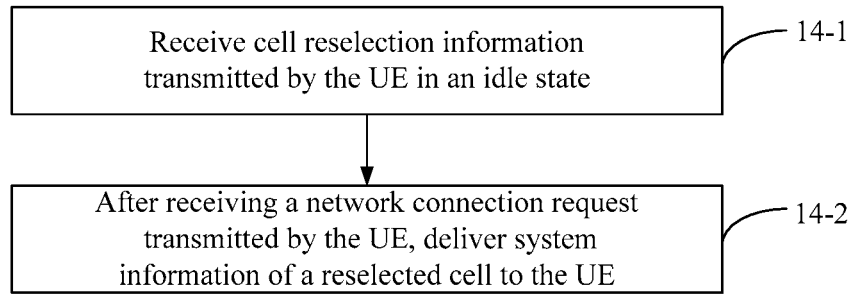
FIG. 5 is a flowchart of another mobility management method illustrated according to an aspect of the present disclosure.

In the second case, referring to FIG. 5, which illustrates a flowchart of still another mobility management method according to an aspect, the Step 14 may include following steps.

In Step 14-1, cell reselection information transmitted by the user equipment in an idle state is received.

In one or more embodiments of the present disclosure, the UE in the idle state may reselect a cell according to the target area information delivered by the network side equipment and cell signal information detected by the UE, and report the cell reselection information to the network side equipment.

In Step 14-2, after receiving a network connection request transmitted by the user equipment, system information of the reselected cell is delivered to the user equipment.

In the present disclosure, the network side equipment receives the cell reselection information transmitted by the UE, for example, the second cell. The network side equipment may record the cell reselection information of the UE. When subsequently receiving the network connection request of the UE, system information of the second cell is delivered to the UE, so that the UE is synchronized with the second cell according to the system information and then is accessed to the second cell.

Correspondingly, the present disclosure also provides a mobility management method applied to a user equipment.

Figure 6:
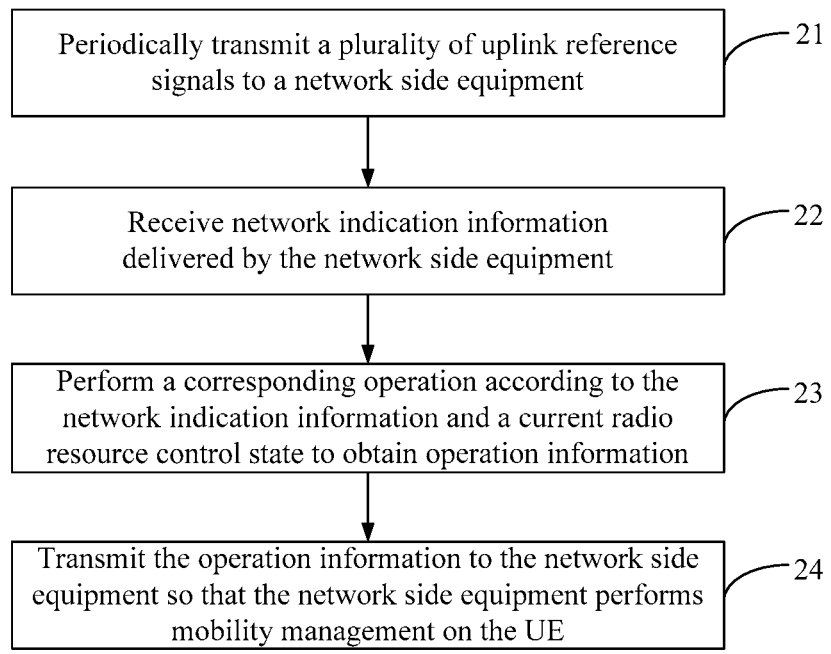
FIG. 6 is a flowchart of a mobility management method illustrated according to an aspect of the present disclosure.

Referring to FIG. 6, which illustrates a flowchart of a mobility management method according to an aspect, the method may include following steps.

In Step 21, a plurality of uplink reference signals is periodically transmitted to a network side equipment.

In the present disclosure, the user equipment moving at high speed may periodically transmit a plurality of uplink reference signals to an access base station cell, so that the access base station cell reports the plurality of uplink reference signals of the UE or variation information of the plurality of uplink reference signals to the network side equipment such as a core network equipment, so that the core network equipment generates network indication information according to the variation information of the plurality of uplink reference signals.

In Step 22, network indication information delivered by the network side equipment is received.

In the present disclosure, the network indication information at least includes cell identifiers of one or more to-be-selected cells adjacent to a current access base station cell such as a first cell, and area identifiers of areas to which the to-be-selected cells belong. The information may be collectively referred to as target area information.

In Step 23, a corresponding operation is performed according to the network indication information and a current radio resource control (RRC) state to obtain operation information.

In the present disclosure, the RRC state of the UE may include a connected state and an idle state. Supposing the UE is a mobile phone, when the mobile phone is in a call state, surfing the Internet with the mobile phone, or a video telephone state, this indicates that the mobile phone is in the connected state. Otherwise, when a user does not use the mobile phone, this indicates that the mobile phone is in the idle state.

When the UE is in the connected state, the mobility management of the UE is under the control of a handover technology. When the UE is in the idle state, the mobility management thereof is under the control of a cell reselection technology.

Based on this, implementation of the Step 23 in the embodiment of the present disclosure may include the following two cases.

In the first case, when the user equipment currently is in the connected state, a regional signal is measured according to the network indication information to obtain a regional signal measurement result.

In the present disclosure, when the UE is in the connected state, a corresponding downlink reference signal is detected according to the cell identifiers of the to-be-selected cells in the network indication information to obtain the regional signal measurement result.

Exemplarily, supposing the network indication information indicates that current access cells (i.e., cells adjacent to the first cell, i.e., the to-be-selected cells) include: a second cell, a third cell and a fourth cell, the area identifiers of the areas to which these cells belong respectively are B, B and C, as shown in Table I as below:

TABLE I

| To-be-selected Cells | Area Identifiers |
| --- | --- |
| The second cell | B |
| The third cell | B |
| The fourth cell | C |

The UE may respectively detect the intensity and/or quality of signal of each of the to-be-selected cells according to the Table I to obtain the regional signal measurement result. It is to be noted that the signal measurement results of the above to-be-selected cells may likely be 0.

Supposing the signal measurement results of the above to-be-selected cells respectively are 23 dB, 15 dB, and 0 dB, the regional signal measurement results may be expressed, using a preset list, as below:

TABLE II

| To-be-selected cells | Area Identifiers | Signal Measurement Results |
| --- | --- | --- |
| The second cell | B | 23 dB |
| The third cell | B | 15 dB |
| The fourth cell | C | 0 dB |

The regional signal measurement results also may be expressed in the form of following Table III to reduce the amount of data reported by the UE:

TABLE III

| To-be-selected Cells | Area Identifiers | Signal Measurement Results |
| --- | --- | --- |
| The second cell | B | 23 dB |
| The third cell | B | 15 dB |

In the second case, when the user equipment currently is in the idle state, a cell is reselected according to the network indication information to obtain cell reselection information.

When the UE is in the idle state, receivable downlink reference signals of all cells and intensity and/or quality of corresponding signals may be detected.

Exemplarily, supposing cell signal information of all the cells detectable by the UE is as shown in Table IV:

TABLE IV

| Detectable Cells | Signal Measurement Results |
| --- | --- |
| The second cell | 23 dB |
| The third cell | 15 dB |
| The fifth cell | 10 dB |
| The sixth cell | 20 dB |

When the target area information included in the network indication information received by the UE still is as shown in the above Table I, positions where the fifth cell and the sixth cell are may likely not conform to the movement direction of the UE. Therefore, the UE obtains a matching result (namely, information of the second cell and the third cell) by matching the Table I with the Table IV, and selects the second cell, whose signal intensity is the largest, as the reselected target cell according to the matching result.

In Step 24, the operation information is transmitted to the network side equipment so that the network side equipment performs mobility management on the user equipment.

Corresponding to the first case in the Step 23, the UE may transmit the regional signal measurement result as shown in Table II or Table III to the network side equipment. After receiving the regional signal measurement result, the network side equipment may determine the second cell, whose signal intensity is the largest, as the target cell for handover.

Corresponding to the second case in the Step 23, the UE may transmit, to the network side equipment, the cell identifier of the second cell and the area identifier of the area to which the second cell belongs, so that after receiving the cell reselection information of the UE, the network side equipment delivers system information of the second cell to the UE when receiving a network connection request from the UE, allowing the UE to be synchronized with the second cell according to the system information and then accessed to the second cell.

In conclusion, by using the mobility management method provided by the embodiments of the present disclosure, mobility management is performed based on a plurality of uplink reference signals, an information interaction process is simple, a signaling overhead is small, a time length required for cell change may be effectively shortened, and a mobility management efficiency of the system may be increased. Since the time length required for cell handover is shortened, problems such as call drop or network drop caused by user equipment moving at high speed in a connected state may be avoided, so that the communication performance of the user equipment moving at high speed is effectively guaranteed, thereby improving the user experience.

For a brief description, the foregoing method embodiments are described as a combination of a series of actions. However, those skilled in the art should know that the present disclosure is not limited by sequences of the actions described. This is because some steps may be performed by using other sequences or be performed simultaneously in accordance with the present disclosure.

In addition, those skilled in the art should also learn that the embodiments described in the specification are preferred embodiments, and involved motions and modules are not necessary for the present disclosure.

Corresponding to the foregoing embodiments of an application function implementing method, the present disclosure also provides embodiments of an application function implementing apparatus and a corresponding terminal.

Figure 7:
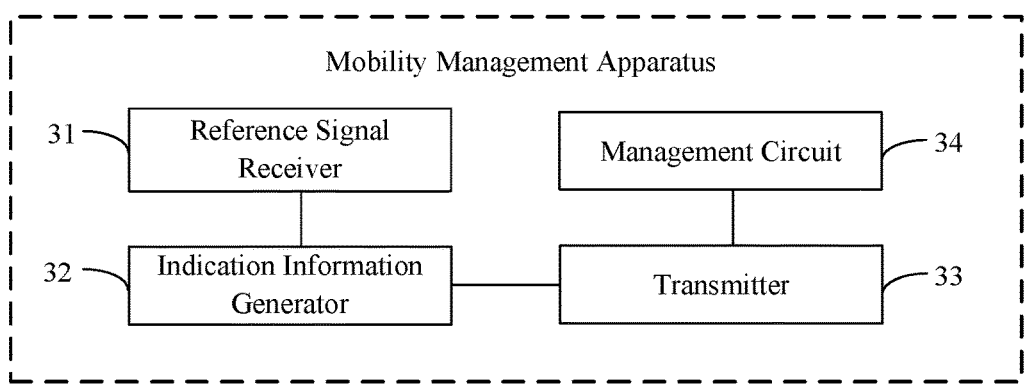
FIG. 7 is a block diagram of a mobility management apparatus illustrated according to an aspect of the present disclosure.

Referring to FIG. 7, a block diagram of a mobility management apparatus illustrated according to an aspect, the mobility management apparatus is arranged in a network side equipment and may include:

a reference signal receiver 31, configured to receive a plurality of uplink reference signals periodically transmitted by user equipment;

an indication information generator 32, configured to generate network indication information according to variation information of the plurality of uplink reference signals;

a transmitter 33, configured to deliver the network indication information to the user equipment so that the user equipment performs a corresponding operation according to the network indication information and feeds back operation information; and a management circuit 34, configured to perform mobility management on the user equipment according to the operation information transmitted by the user equipment.

Figure 8:
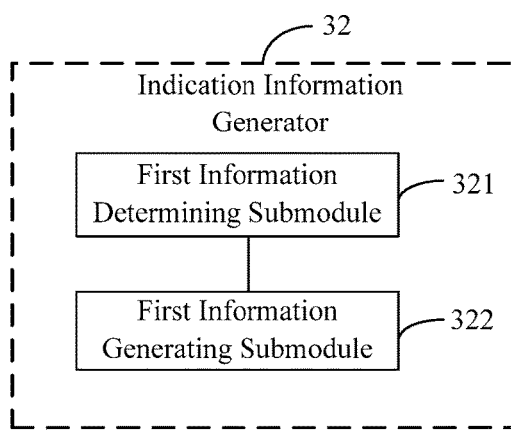
FIG. 8 is a block diagram of another mobility management apparatus illustrated according to an aspect of the present disclosure.

Referring to FIG. 8, a block diagram of another mobility management apparatus illustrated according to an aspect, on the basis of the apparatus embodiment as shown in FIG. 7, the indication information generator 32 may include:

a first information determining submodule 321, configured to acquire target area information when an intensity and/or quality of the plurality of uplink reference signals of the user equipment is below a preset threshold; and a first information generating submodule 322, configured to generate the network indication information according to the target area information.

Figure 9:
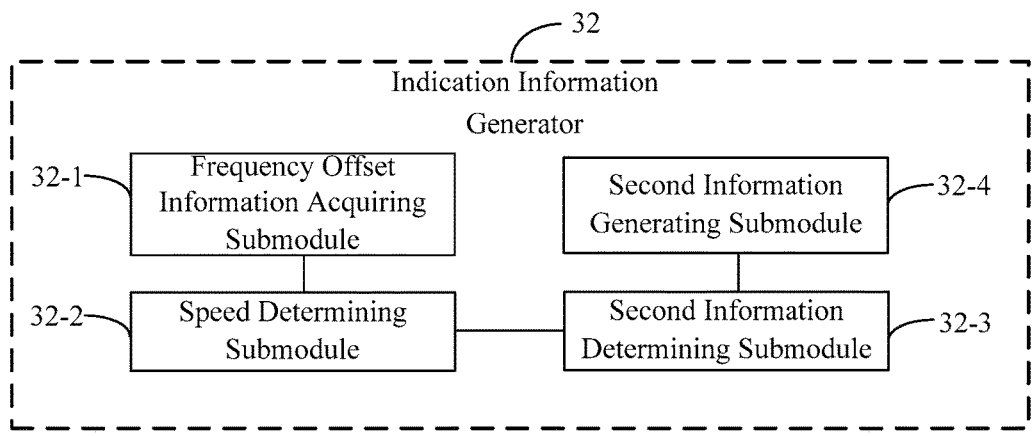
FIG. 9 is a block diagram of another mobility management apparatus illustrated according to an aspect of the present disclosure.

Referring to FIG. 9, a block diagram of another mobility management apparatus illustrated according to an aspect, on the basis of the apparatus embodiment as shown in FIG. 7, the indication information generator 32 may include:

a frequency offset information acquiring submodule 32-1, configured to acquire frequency offset information of the plurality of uplink reference signals;

a speed determining submodule 32-2, configured to determine a movement speed of the user equipment according to the frequency offset information;

a second information determining submodule 32-3, configured to determine target area information according to the movement speed and a current position of the user equipment; and a second information generating submodule 32-4, configured to generate the network indication information according to the target area information.

Figure 10:
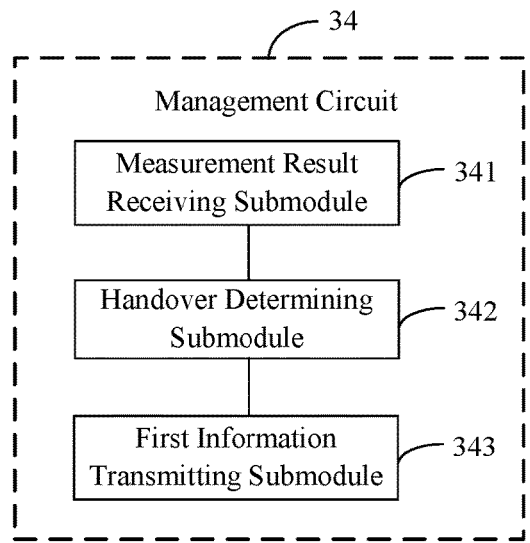
FIG. 10 is a block diagram of another mobility management apparatus illustrated according to an aspect of the present disclosure.

Referring to FIG. 10, a block diagram of another mobility management apparatus illustrated according to an aspect, on the basis of the apparatus embodiment as shown in FIG. 7, the management circuit 34 may include:

a measurement result receiving submodule 341, configured to receive a regional signal measurement result transmitted by the user equipment in a connected state;

a handover determining submodule 342, configured to determine a target cell for handover of the user equipment according to the regional signal measurement result; and a first information transmitting submodule 343, configured to deliver system resource information of the target cell for handover to the user equipment so that the user equipment updates the system resource information.

Figure 11:
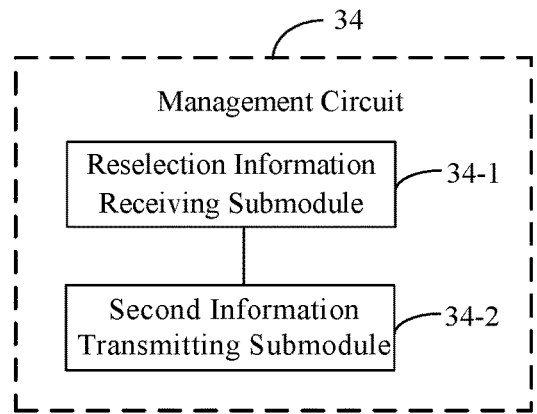
FIG. 11 is a block diagram of another mobility management apparatus illustrated according to an aspect of the present disclosure.

Referring to FIG. 11, a block diagram of another mobility management apparatus illustrated according to an aspect, on the basis of the apparatus embodiment as shown in FIG. 7, the management circuit 34 may include:

a reselection information receiving submodule 34-1, configured to receive cell reselection information transmitted by the user equipment in an idle state; and a second information transmitting submodule 34-2, configured to deliver, after receiving a network connection request transmitted by the user equipment, system information of a reselected cell to the user equipment so that the user equipment accesses the reselected cell.

Figure 12:
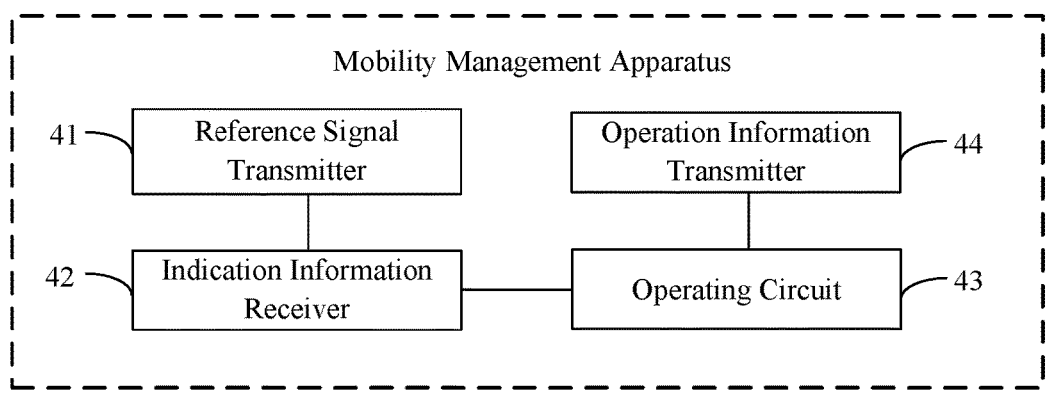
FIG. 12 is a block diagram of a mobility management apparatus illustrated according to an aspect of the present disclosure.

Correspondingly, the present disclosure provides a mobility management apparatus that may be arranged in a user equipment. Referring to FIG. 12, a block diagram of a mobility management apparatus illustrated according to an aspect, the apparatus may include:

a reference signal transmitter 41, configured to periodically transmit a plurality of uplink reference signals to network side equipment;

an indication information receiver 42, configured to receive network indication information delivered by the network side equipment;

an operating circuit 43, configured to perform a corresponding operation according to the network indication information and a current radio resource control state to obtain operation information; and an operation information transmitter 44, configured to transmit the operation information to the network side equipment so that the network side equipment performs mobility management on the user equipment.

Figure 13:
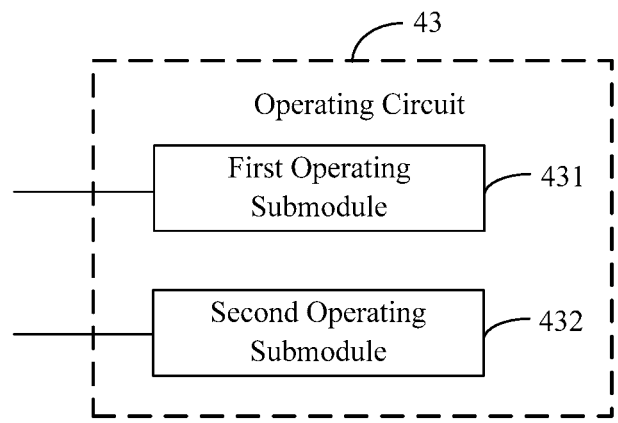
FIG. 13 is a block diagram of another mobility management apparatus illustrated according to an aspect of the present disclosure.

Referring to FIG. 13, a block diagram of another mobility management apparatus illustrated according to an aspect, on the basis of the apparatus embodiment as shown in FIG. 12, the operating circuit 43 may include:

a first operating submodule 431, configured to measure, when the user equipment currently is in a connected state, a regional signal according to the network indication information to obtain a regional signal measurement result; and a second operating submodule 432, configured to reselect, when the user equipment currently is in an idle state, a cell according to the network indication information to obtain cell reselection information.

Apparatus embodiments are basically corresponding to the method embodiments, and thus the method embodiments may serve as reference. The apparatus embodiments set forth above are merely exemplary, wherein units described as detached parts can be or not be detachable physically; parts displayed as units can be or not be physical units, i.e., either located at the same place, or distributed on a plurality of network units. Modules can be selected in part or in whole according to the actual needs for realization of solutions of the present disclosure. Further, a module or a submodule may be implemented at least partially using a hardware circuit, software, or a combination of hardware circuit and software. It is conceivable and executable for those of ordinary skill in the art without creative labor.

Correspondingly, in one aspect, an embodiment of the present disclosure provides a mobility management apparatus, which includes: a processor, and a memory, configured to store instructions executable by the processor. The processor is configured to:

receive a plurality of uplink reference signals periodically transmitted by a user equipment;

generate network indication information according to variation information of the plurality of uplink reference signals;

deliver the network indication information to the user equipment so that the user equipment performs a corresponding operation according to the network indication information and feeds back operation information; and perform mobility management on the user equipment according to the operation information transmitted by the user equipment.

Figure 14:
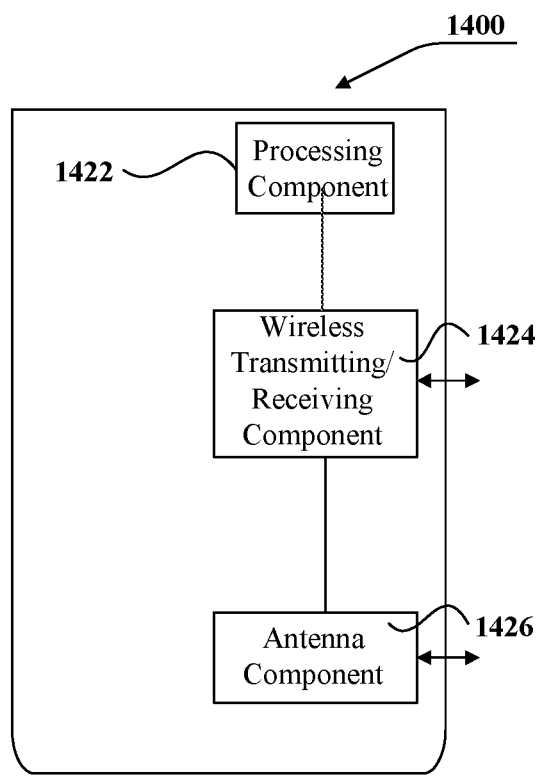
FIG. 14 is a schematic structural diagram of a mobility management apparatus illustrated according to an aspect of the present disclosure.

FIG. 14 is a schematic structural diagram of a mobility management apparatus 1400 illustrated according to an aspect. The apparatus 1400 may be provided as a base station. Referring to FIG. 14, the apparatus 1400 includes a processing component 1422, a wireless transmitting/receiving component 1424, an antenna component 1426, and a signal processing portion peculiar to a wireless interface. The processing component 1422 may further include one or more processors.

One processor of the processing component 1422 may be configured to:

receive a plurality of uplink reference signals periodically transmitted by a user equipment;

generate network indication information according to variation information of the plurality of uplink reference signals;

deliver the network indication information to the user equipment so that the user equipment performs a corresponding operation according to the network indication information and feeds back operation information; and perform mobility management on the user equipment according to the operation information transmitted by the user equipment.

In another aspect, an embodiment of the present disclosure provides a mobility management apparatus, which includes: a processor, and a memory, configured to store instructions executable by the processor. The processor is configured to: periodically transmit a plurality of uplink reference signals to a network side equipment; receive network indication information delivered by the network side equipment; perform a corresponding operation according to the network indication information and a current radio resource control state to obtain operation information; and transmit the operation information to the network side equipment so that the network side equipment performs mobility management on the user equipment.

Figure 15:
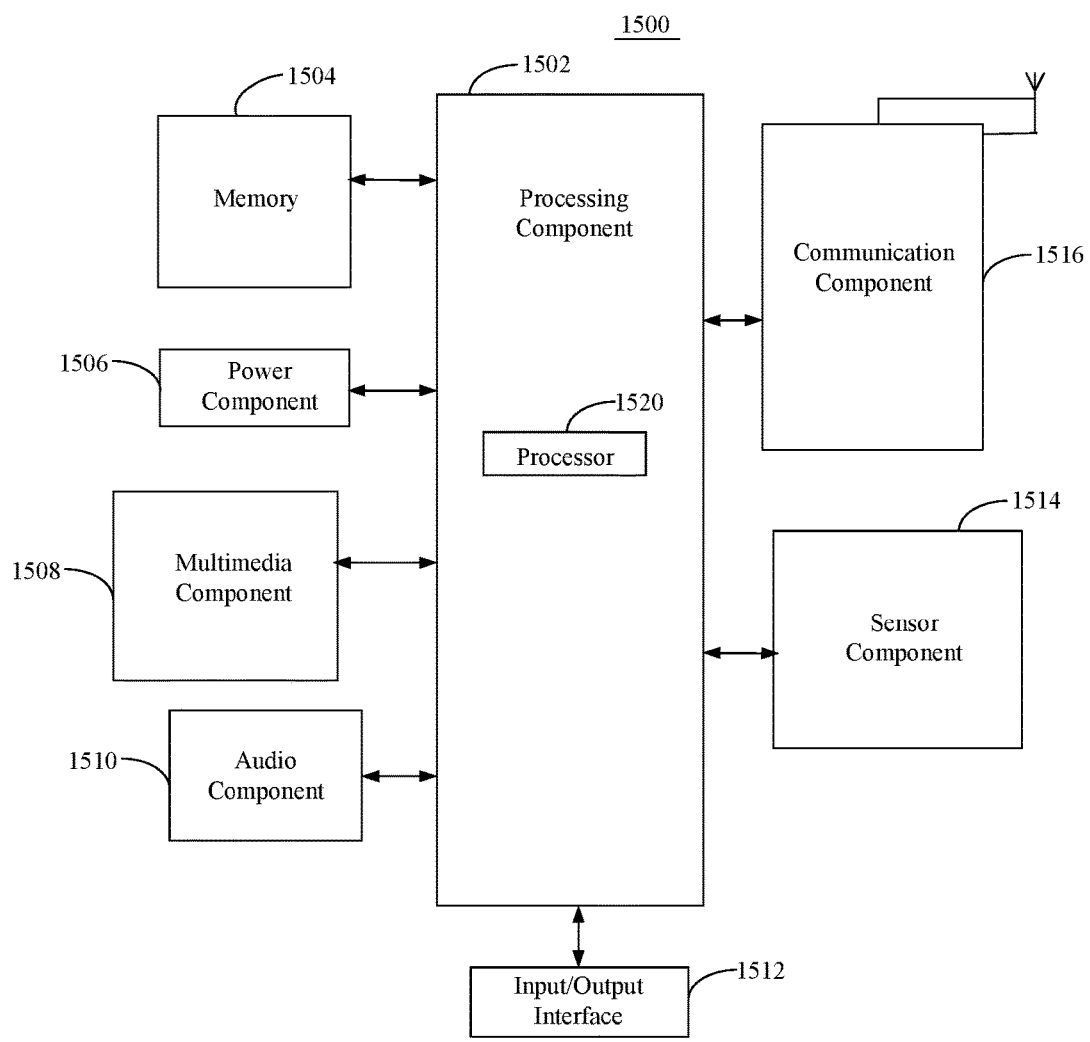
FIG. 15 is a schematic structural diagram of a mobility management apparatus illustrated according to an aspect of the present disclosure.

FIG. 15 is a schematic structural diagram of a mobility management apparatus 1500 illustrated according to an aspect. For example, the apparatus 1500 may be a user equipment, and specifically may be a mobile phone, a computer, a digital broadcast terminal, a message transceiver device, a game console, a tablet device, a medical equipment, a fitness equipment, a personal digital assistant, and a wearable device such as a smart watch, smart glasses, a smart wristband, smart shoes and the like.

Referring to FIG. 15, the apparatus 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the apparatus 1500, such as operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between the processing component 1502 and other components For instance, the processing component 1502 may include a multimedia module to facilitate the interaction between the multimedia component 1508 and the processing component 1502.

The memory 1504 is configured to store various types of data to support the operation of the apparatus 1500. Examples of such data include instructions for any applications or methods operated on the apparatus 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the apparatus 1500. The power component 1506 may include a power management system, one or more power sources, and any other components associated with the generation, management, and distribution of power in the apparatus 1500.

The multimedia component 1508 includes a screen providing an output interface between the apparatus 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1508 includes a front camera and/or a rear camera. The front camera and/or the rear camera may receive an external multimedia datum while the apparatus 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone ("MIC") configured to receive an external audio signal when the apparatus 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. These buttons may include, but are not limited to, a home button, a volume button, a starting button, and a locking button.

The sensor component 1514 includes one or more sensors to provide status assessments of various aspects of the apparatus 1500. For instance, the sensor component 1514 may detect an open/closed status of the apparatus 1500, relative positioning of components, e.g., the display and the keypad, of the apparatus 1500, a change in position of the apparatus 1500 or a component of the apparatus 1500, a presence or absence of user contact with the apparatus 1500, an orientation or an acceleration/deceleration of the apparatus 1500, and a change in temperature of the apparatus 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the apparatus 1500 and other devices. The apparatus 1500 can access a wireless network based on a communication standard, such as WiFi, 2G; or 3G; or a combination thereof. In one exemplary embodiment, the communication component 1516 receives a broadcast signal or broadcast associated information from an external broadcast management system via a broadcast channel. In one exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1504, executable by the processor 1520 in the apparatus 1500, for performing the above-described methods. For example, the non-transitory computer-readable storage medium may be a ROM, a RAM, a CD-ROM, a magnetic tape, a floppy disc, an optical data storage device, and the like.

When the instructions in the memory 1504 are executed by the processing component 1502, the apparatus 1500 is caused to perform a mobility management method, including: periodically transmitting a plurality of uplink reference signals to network side equipment; receiving network indication information delivered by the network side equipment; performing a corresponding operation according to the network indication information and a current radio resource control state to obtain operation information; and transmitting the operation information to the network side equipment so that the network side equipment performs mobility management on the user equipment.

The technical solutions provided by the embodiments of the present disclosure may include following beneficial effects.

By using the mobility management method provided by the present disclosure, mobility management is performed based on a plurality of uplink reference signals, an information interaction process is simple, a signaling overhead is small, a time length required for cell change may be effectively shortened, a mobility management efficiency of a system is increased, and communication performance of a user equipment moving at high speed is improved, thereby improving user experience.

In the present disclosure, the network side equipment may acquire target area information when it is detected that an intensity and/or quality of the plurality of uplink reference signals of the user equipment is below a preset threshold, and timely make preparations for cell handover or provide information for the user equipment to reselect a cell, thereby improving timeliness in mobility management.

In the present disclosure, the network side equipment may pre-estimate an area where the user equipment likely passes through in the next moment according to the acquired frequency offset information of the plurality of uplink reference signals, and provide reference information for cell handover or reselecting a cell, thereby improving efficiency and accuracy in determining a target area. Furthermore, the network side equipment may inform, in advance, the user equipment of the determined target area information, so that the user equipment can immediately measure a regional signal or reselect a cell when entering into a to-be-selected area, thereby shortening time spent for acquiring cell change information.

In the present disclosure, when performing mobility management on the user equipment in a connected state, the network side equipment receives, after delivering the target area information to the user equipment, a regional signal measurement result obtained by each user equipment according to the target area information, thereby determining a target cell for handover according to the signal measurement result. In this way, time length required for cell handover can be effectively shortened, problems such as call drop or network drop caused by a user equipment moving at high speed in a connected state are avoided, and the communication performance of the user equipment moving at high speed is effectively guaranteed, thereby improving the user experience.

In the present disclosure, when the network side equipment performs mobility management on the user equipment in a connected state, after the target area information is delivered to the user equipment, the user equipment in an idle state may reselect a cell based on the target area information, and transmit cell reselection information to the network side equipment, so that the network side equipment timely delivers system information of a reselected cell to the user equipment. It is guaranteed that the user equipment may access a cell or an area with good communication performance when the user equipment is switched to a connected state, and that the user equipment still has good communication performance when moving at high speed, thereby improving the user experience.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A mobility management method, applied to a network side equipment, comprising:
   receiving a plurality of uplink reference signals periodically transmitted by a user equipment;
   generating network indication information according to variation information of the plurality of uplink reference signals;
   delivering the network indication information to the user equipment, enabling the user equipment to perform a corresponding operation according to the network indication information and transmit operation information; and
   performing mobility management on the user equipment according to the operation information transmitted by the user equipment, wherein the performing mobility management on the user equipment according to the operation information transmitted by the user equipment further comprises:
   receiving a regional signal measurement result transmitted by the user equipment in a connected state;
   determining a target cell for handover of the user equipment according to the regional signal measurement result; and
   delivering system resource information of the target cell for handover to the user equipment, enabling the user equipment to update the system resource information.

2. The method according to claim 1, wherein the generating network indication information according to variation information of the plurality of uplink reference signals comprises:
   acquiring target area information when at least one of an intensity and quality of the plurality of uplink reference signals of the user equipment is below a preset threshold; and
   generating the network indication information according to the target area information.

3. The method according to claim 1, wherein the generating network indication information according to variation information of the plurality of uplink reference signals comprises:
   acquiring frequency offset information of the plurality of uplink reference signals;
   determining a movement speed of the user equipment according to the frequency offset information;
   determining target area information according to the movement speed and a current position of the user equipment; and
   generating the network indication information according to the target area information.

4. The method according to claim 1, wherein the performing mobility management on the user equipment according to the operation information transmitted by the user equipment comprises:
   receiving cell reselection information transmitted by the user equipment in an idle state; and
   after receiving a network connection request transmitted by the user equipment, delivering system information of a reselected cell to the user equipment, enabling the user equipment to access the reselected cell.

5. A mobility management method, applied to a user equipment, comprising:
   periodically transmitting a plurality of uplink reference signals to a network side equipment;
   receiving network indication information delivered by the network side equipment;
   performing a corresponding operation according to the network indication information and a current radio resource control state to obtain operation information;
   transmitting the operation information to the network side equipment, enabling the network side equipment to perform mobility management on the user equipment; and
   performing mobility management on the user equipment according to the operation information transmitted by the user equipment comprises:
   receiving a regional signal measurement result transmitted by the user equipment in a connected state;
   determining a target cell for handover of the user equipment according to the regional signal measurement result; and
   delivering system resource information of the target cell for handover to the user equipment, enabling the user equipment to update the system resource information.

6. The method according to claim 5, wherein the performing a corresponding operation according to the network indication information and a current radio resource control state to obtain operation information comprises:
   when the user equipment currently is in a connected state, measuring a regional signal according to the network indication information to obtain a regional signal measurement result.

7. The method according to claim 5, wherein the performing a corresponding operation according to the network indication information and a current radio resource control state to obtain operation information comprises:
   when the user equipment currently is in an idle state, reselecting a cell according to the network indication information to obtain cell reselection information.

8. A mobility management apparatus, comprising:
   a processor, and
   a memory, configured to store instructions executable by the processor;
   wherein the processor is configured to:
   receive a plurality of uplink reference signals periodically transmitted by a user equipment;

generate network indication information according to variation information of the plurality of uplink reference signals;

deliver the network indication information to the user equipment, enabling the user equipment to perform a corresponding operation according to the network indication information and transmit operation information; and perform mobility management on the user equipment according to the operation information transmitted by the user equipment, wherein the processor configured to perform mobility management on the user equipment according to the operation information transmitted by the user equipment is further configured to:

receive a regional signal measurement result transmitted by the user equipment in a connected state;

determine a target cell for handover of the user equipment according to the regional signal measurement result; and deliver system resource information of the target cell for handover to the user equipment, enabling the user equipment to update the system resource information.

9. The apparatus according to claim 8, wherein the processor configured to generate network indication information according to variation information of the plurality of uplink reference signals is configured to:

acquire target area information when at least one of an intensity and quality of the plurality of uplink reference signals of the user equipment is below a preset threshold; and generate the network indication information according to the target area information.

10. The apparatus according to claim 8, wherein the processor configured to generate network indication information according to variation information of the plurality of uplink reference signals is configured to:

acquire frequency offset information of the plurality of uplink reference signals;

determine a movement speed of the user equipment according to the frequency offset information;

determine target area information according to the movement speed and a current position of the user equipment; and generate the network indication information according to the target area information.

11. The apparatus according to claim 8, wherein the processor configured to perform mobility management on the user equipment according to the operation information transmitted by the user equipment is configured to:

receive cell reselection information transmitted by the user equipment in an idle state; and deliver, after receiving a network connection request transmitted by the user equipment, system information of a reselected cell to the user equipment, enabling the user equipment to access the reselected cell.

12. A mobility management apparatus, comprising:

a processor and a second processor, and a memory, configured to store instructions executable by the processor;

wherein the processor is configured to:

periodically transmit a plurality of uplink reference signals to a network side equipment;

receive network indication information delivered by the network side equipment;

perform a corresponding operation according to the network indication information and a current radio resource control state to obtain operation information; and transmit the operation information to the network side equipment, enabling the network side equipment to perform mobility management on a user equipment, wherein the second processor configured to perform mobility management on the user equipment according to the operation information transmitted by the user equipment is further configured to:

receive a regional signal measurement result transmitted by the user equipment in a connected state;

determine a target cell for handover of the user equipment according to the regional signal measurement result; and deliver system resource information of the target cell for handover to the user equipment, enabling the user equipment to update the system resource information.

13. The apparatus according to claim 12, wherein the processor configured to perform a corresponding operation according to the network indication information and a current radio resource control state to obtain operation information is configured to:

measure, when the user equipment currently is in a connected state, a regional signal according to the network indication information to obtain a regional signal measurement result.

14. The apparatus according to claim 12, wherein the processor configured to perform a corresponding operation according to the network indication information and a current radio resource control state to obtain operation information is configured to:

reselect, when the user equipment currently is in an idle state, a cell according to the network indication information to obtain cell reselection information.

* * * * *